United States Patent [19]

Weiler

[11] 4,140,255
[45] Feb. 20, 1979

[54] SPARE WHEEL CARRIER FOR VEHICLES
[75] Inventor: Raywood C. Weiler, Fontana, Calif.
[73] Assignee: Blackstone Mfg. Co., Inc., Chicago, Ill.
[21] Appl. No.: 809,525
[22] Filed: Jun. 24, 1977
[51] Int. Cl.$^2$ .............................................. B62D 43/02
[52] U.S. Cl. ............................... 224/42.06; 224/42.21; 292/107; 292/127
[58] Field of Search ...................... 224/42.03 R, 42.06, 224/42.07, 42.08, 42.12, 42.21, 42.23, 42.25, 42.28; 214/451, 453, 454; 296/37.2; 70/259, 260; 248/293; 292/107, 127, 209, 227

[56] References Cited
U.S. PATENT DOCUMENTS

| | | | |
|---|---|---|---|
| 1,595,402 | 8/1926 | Iler | 292/107 X |
| 2,480,923 | 9/1949 | Hatchette | 292/107 |
| 3,330,445 | 7/1967 | Cooper | 224/42.06 |
| 3,343,736 | 9/1967 | Sellers | 224/42.06 |
| 3,669,326 | 6/1972 | Podraza | 224/42.21 |
| 3,700,130 | 10/1972 | Holdread | 214/454 |
| 3,822,814 | 7/1974 | Baldi | 224/42.06 |

FOREIGN PATENT DOCUMENTS 64105  3/1914  Fed. Rep. of Germany ........... 292/127

Primary Examiner—Trygve M. Blix
Assistant Examiner—Winston H. Douglas
Attorney, Agent, or Firm—Arnstein, Gluck, Weitzenfeld & Minow

[57] ABSTRACT

A bumper mounted spare wheel carrier for a vehicle is foldable downwardly to afford access to a trunk or door of the vehicle. The carrier includes a spring biased latch element which secures the carrier in vertical position. A resilient operating lever secured to the latch element is deformable under stress and when maintained in stressed condition provides a positive safety lock for the latch element independent of the spring biasing means. Novel wheel retaining means cooperating with the carrier selectively secure different sizes of wheels on the carrier.

2 Claims, 13 Drawing Figures

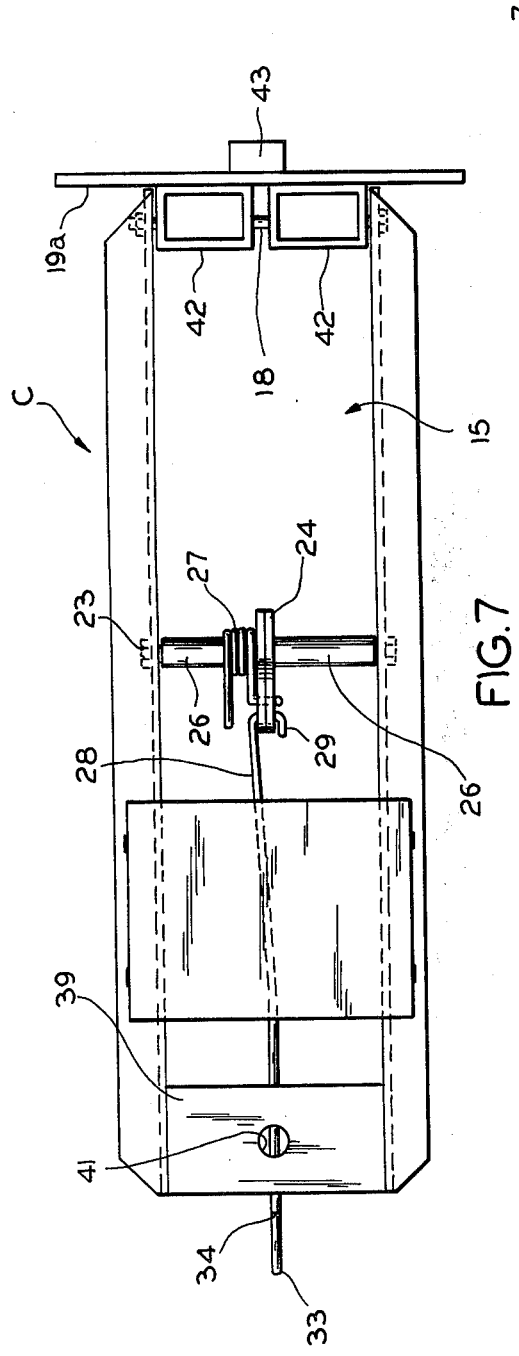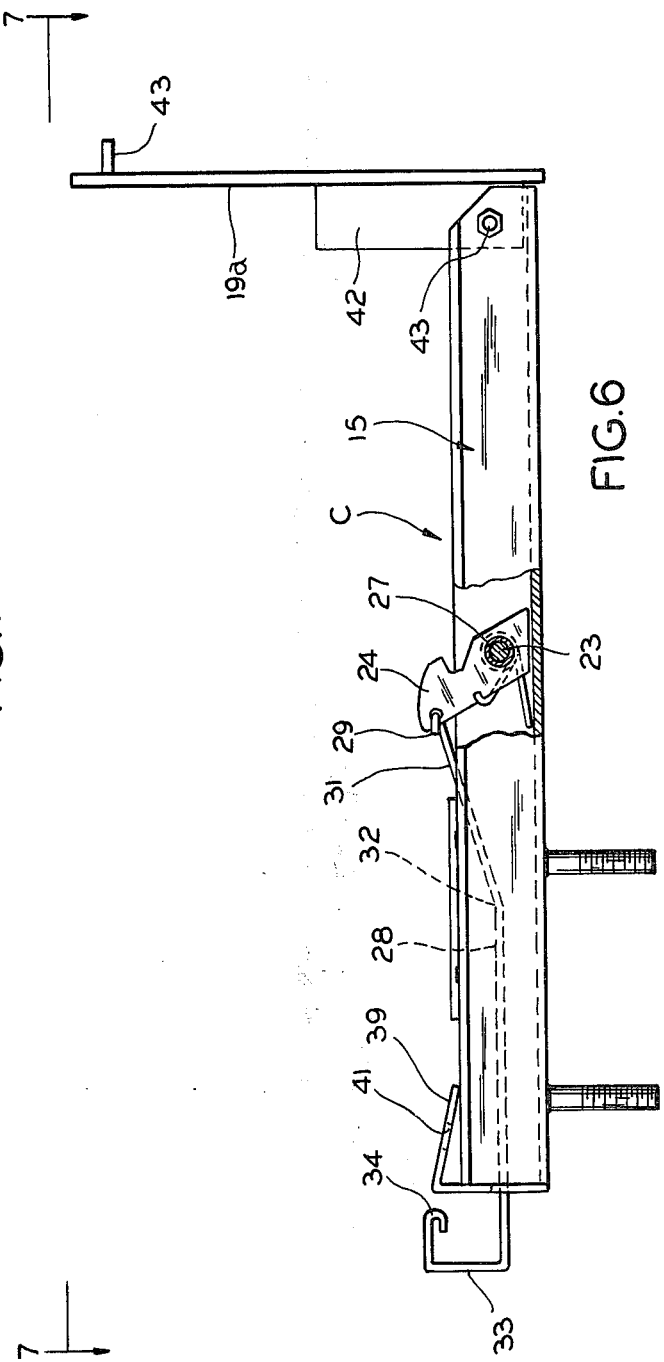

SPARE WHEEL CARRIER FOR VEHICLES

BACKGROUND OF THE INVENTION

The present invention relates to spare wheel carriers for vehicles and more particularly to such carriers adapted to be mounted on the rear bumper of a vehicle, such as a travel trailer or motor home. The carrier is foldable downwardly to afford easy access to a trunk or door at the rear of the vehicle and includes novel latching means for securing the carrier in upright position. The arrangement includes a resilient lever which provides a positive safety lock for the latch which is effective to keep the carrier from dropping to down position, even if the latch spring were to break. The same lever provides means for actuating the latch to release position. The carrier includes a novel wheel mounting and securing means which permits each carrier to selectively mount one of at least two different sizes of vehicle wheels having different hole patterns in the hubs.

BRIEF DESCRIPTION OF THE DRAWINGS

FIG. 6 is a view of the entire wheel carrier similar to FIG. 2, with parts broken away and showing the carrier in fold down position.

FIG. 7 is a top plan view of the carrier shown in FIG. 6.

BRIEF DESCRIPTION OF PREFERRED EMBODIMENTS

Figure 3:
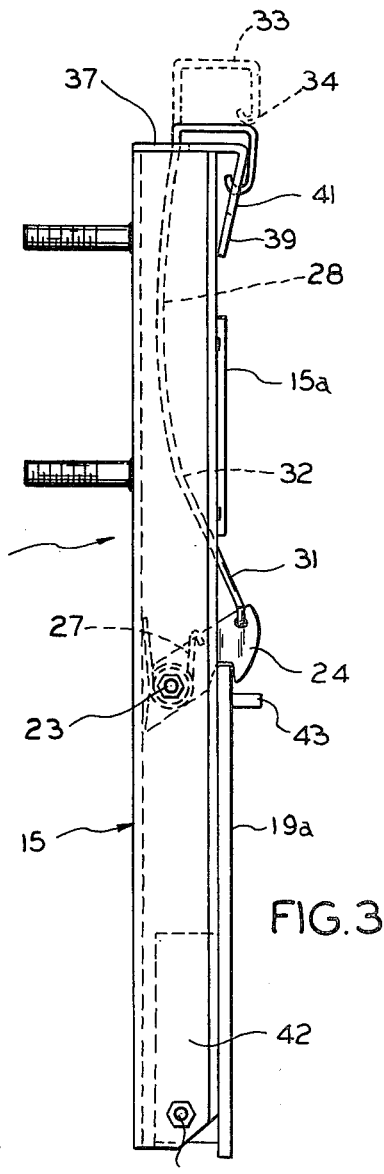
FIG. 3 is a vertical cross-sectional view, on an enlarged scale, of the carrier illustrated in FIG. 1, but in latched position, and with the handle for the latch in released position indicated in broken lines.

Referring to FIGS. 1 to 5 the wheel carrier C, in accordance with my invention, comprises a channel member 15 having side walls 16, 16, each provided with an outwardly extending flange 17. At the lower end the side walls 16 are provided with a pair of axially aligned apertures in which are received a bolt or shaft 18 carried by a bumper plate assembly 19, hereinafter to be described. Extending forwardly from the forwardly directed wall 21 of the channel member 15 are a pair of studs or bolts 22. The channel member 15 is provided with a rear plate 15a which is welded to the flanges 17. A shaft 23 is received in a pair of axially aligned holes in the walls 16, the holes being located substantially medially of the length of the channel member 15. A latch element 24, shaped substantially as illustrated in FIGS. 3 and 6, is pivotally mounted on the shaft 23 and terminates in a hook portion for engaging with the mounting plate. The latch element 24 is maintained in a center position by a pair of spacing sleeves 26 carried on the shaft 23 and is biased in a clockwise direction, as viewed in FIG. 3, by a torsion spring 27. A resilient actuating lever 28 has its lower end terminating in a hook portion 29 which is received in an aperture in the latch element 24. As seen in FIG. 3, the lower portion 31 of the lever 28 is bent at an angle, as at 32, in relation to the main body of the lever. The upper end of the lever 28 is bent at a right angle to the main body portion to form a handle 33 and is again bent downwardly and terminates in a hook portion 34.

The channel member 15 is capped by an angle iron 36, the legs of which are disposed at an acute angle relative to each other. The leg 37 is provided with a slot 38 and is welded to the side walls 16 and forward wall of the channel member 15. The other leg 39 of the angle member is disposed in the relation illustrated in FIG. 3 and is provided with an aperture 41, for a purpose as will be hereinafter explained. As will be seen in the drawings, the main body portion of the lever 28 extends through the slot 38 and the handle portion 33 of the lever overlies the leg 37 of the angle member. The lever 28 is formed of relatively spring-like stock and the particular shape of the lever permits the lever when stressed to be deformed while under stress.

The bumper assembly 19 comprises a mounting plate 19a preferably formed of heavy gauge steel metal. A pair of channels 42, 42 are welded to the forward face of the mounting plate 19a, as seen clearly in FIGS. 6 and 7. The channels 42, 42 are disposed in parallel relation and are pierced to provide axially aligned holes in which are received a shaft 18 which pivotally supports the channel member 15. A flange 43 extends from the rearward face of the mounting plate 19a which is provided with two series of upper and lower spaced holes 44 arranged to straddle the bumper 45 of a vehicle. Said plate cooperates with a pair of clamping bars 46 which are adapted to be butted against the rear face of the bumper for securing the plate to the bumper as with bolts 47.

Referring to FIG. 3, it will be seen that the plate 19a is of such height that the hook portion of latching element 24 will engage the upper edge of the plate to lock the channel member 15 in vertical position. It will be noted the the latch element 24 normally is biased into engagement with the upper edge of the plate 19a. In order to effect release of the latch element 24, the lever 28 is raised upwardly to the position illustrated by the handle 33 shown in broken lines lines in FIG. 3. This, of course, is accomplished by grasping the handle 33 of the lever, after first disengaging the hook portion 34 from the aperture 41. The lever 28 is sufficiently resilient so that it may be temporarily deformed to effect the disengagement. In such disengaged position the lever 28 then is drawn upwardly to the broken line position illustrated in FIG. 3 and the latch element 24 is rocked counterclockwise, as viewed in FIG. 3, out of engagement with the plate 19a. The channel member 15 now may be allowed to drop to the horizontal position illustrated in FIG. 6 to afford access to a trunk or a door at the rear of the vehicle.

When the channel member 15 is being restored to vertical position, the latch element 24 is caused to be cammed counter-clockwise by the upper edge of the plate 19a and the torsion spring 27 will then cause the latch element 24 to engage with the plate 19a to effect locking of the channel member 15 in vertical position.

To further effect positive latching and to insure against inadvertent disengagement of the latch element 24, should the spring 27 be broken, the lever 28 is pushed into the position illustrated in FIG. 3 so as to engage hook 34 in aperture 41. In such condition the lever 28 is caused to be deformed and, because it is resilient, it will apply a strong bias to the latch element 24 retaining it in engagement with the plate 19a. Accordingly, it will be seen that the spring 27 and lever 28 function independently to retain the latch element 24 in latching position. Even if spring 27 were to break, latch element 24 would be held in secure engagement with the plate 19a.

Figures 4, 5:
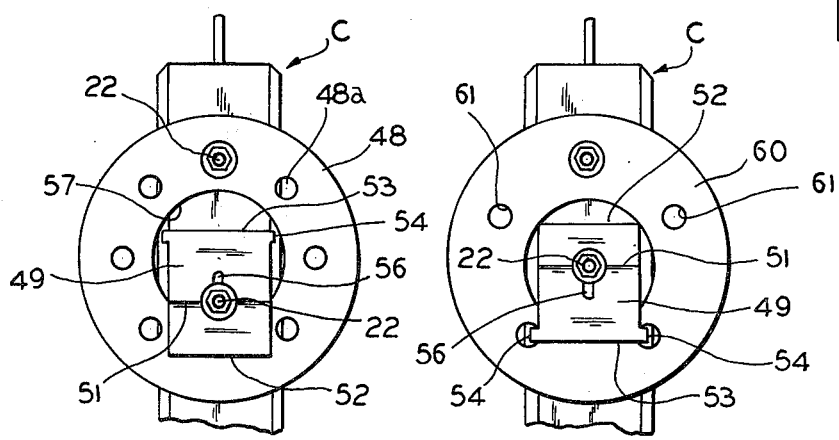
FIGS. 4 and 5 are fragmentary front elevational views showing the manner in which wheels having different lug hole arrangements in the hubs are mounted on the carrier.
Figure 8:
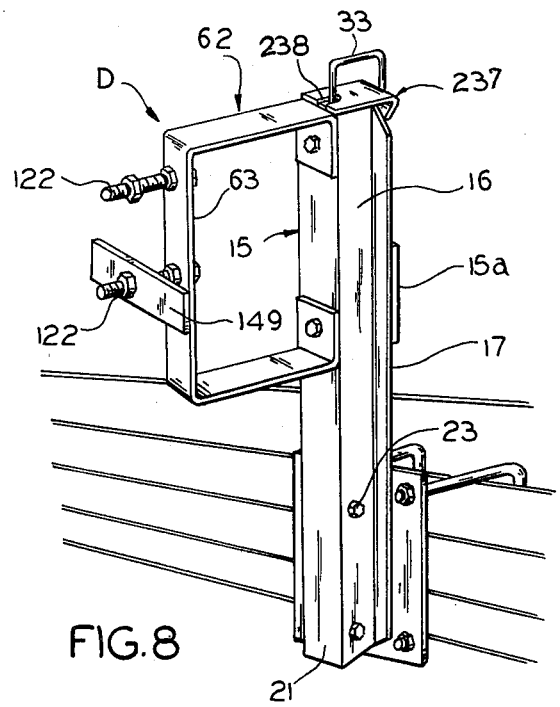
FIG. 8 is a front perspective view of a modified embodiment of the carrier, shown attached to a bumper vehicle and in latched position.
Figure 9:
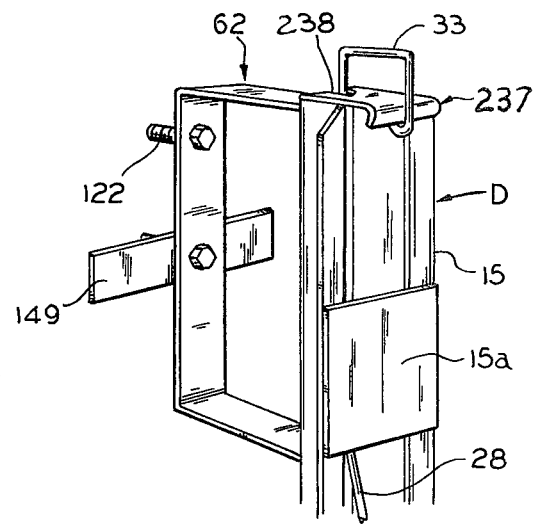
FIG. 9 is a fragmentary rear perspective view of the top part of the carrier shown in FIG. 8.
Figure 10:
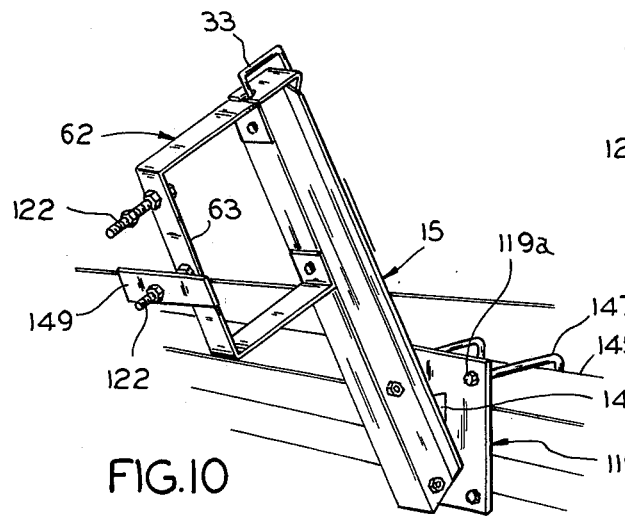
FIG. 10 is a view similar to FIG. 8 but showing the carrier in unlatched position.

Referring to FIGS. 4 and 5, there are shown two types of wheel hubs which may be supported on the carrier C. It will be understood that only the hub portions of the wheels are illustrated because it is only those portions which cooperate with the carrier, hereinabove described.

Figure 1:
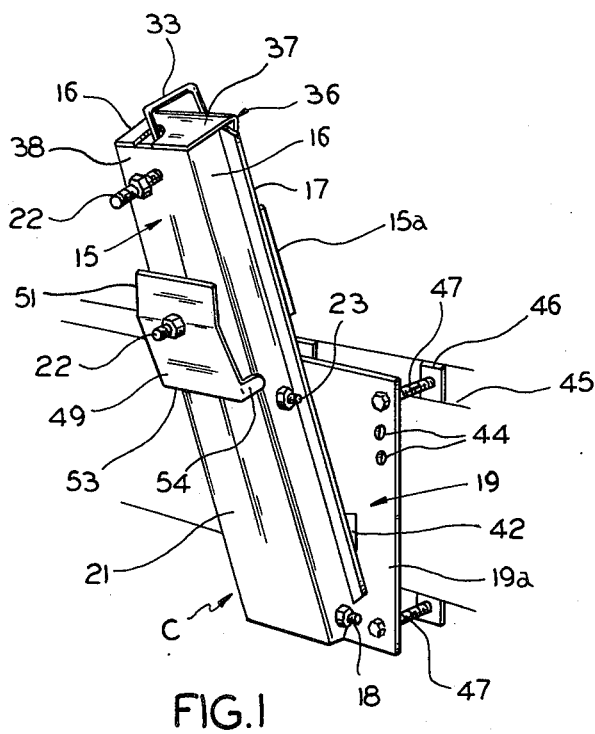
FIG. 1 is a front perspective view of a spare wheel carrier, in accordance with my invention, shown mounted on the bumper of a vehicle, in unlatched position.
Figure 2:
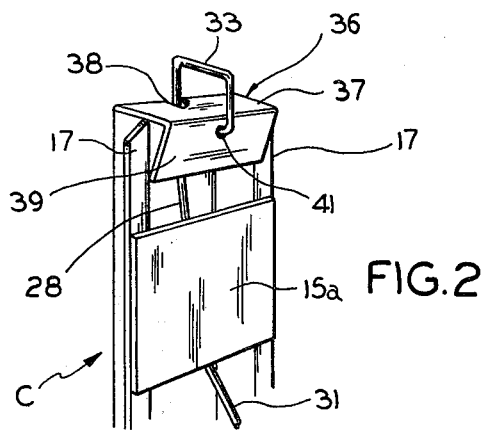
FIG. 2 is a fragmentary rear perspective view of the upper portion of the carrier shown in FIG. 1.

In FIG. 4, the hub 48 of the wheel has eight mounting holes 48a, any one of which may receive the upper stud 22, with the wheel being secured by a nut cooperating with the stud. For further securement of the wheel a retaining member 49, shaped substantially as illustrated in FIGS. 1, 4 and 5, is provided. Said member is formed of heavy gauge sheet metal and, preferably, is bent along a line 51 spaced from and parallel to one of the edges 52. Adjacent the opposite edge 53, the member 49 has a pair of parallel lugs 54 disposed at right angles to the plane of the main body portion of the member. The spacing between the lugs 54 is greater than the width of the channel member 15 so that the lugs 54 actually embrace the channel, as illustrated in FIG. 1. An elongated slot 56 is provided in the member 49 to receive the lower stud 22.

In order to secure a wheel having a hub with eight stud holes, the retaining member 49 is positioned over the hub 48, as illustrated in FIG. 4, with the lugs 54 disposed in an upward position and inside the central circular opening 57 of the hub. In this position the lugs 53 serve to locate the hub 48 in proper mounting position and also limit the possible movement of the hub supported on the upper stud 22. The member 49 is secured in position by a nut which cooperates with the lower stud 22 to clamp the hub to the carrier.

In the case of a wheel having a hub 60 with five lug holes 61, the position of the retaining member 49 is reversed in relation to FIG. 5 wherein the lugs are received in two adjacent holes 61 of the wheel hub. In this position, it will seen, the lugs 54 also serve to limit the movement of the wheel when the same is mounted on the upper stud 22.

FIGS. 8 through 10 and 13 show a tire carrier D similar in many respects to that shown in FIG. 1 and like parts are denoted by the same reference numerals as in FIG. 1.

In this modified embodiment the channel 15 is capped by a plate 237 welded thereto. The plate 237 includes a slot 238 and has an overhanging portion terminating in a depending lip 239. The hook 34 is adapted to engage the lip 239 to effect securement of the latch element 24. The lip 239 may be inclined or vertical, as illustrated.

Figure 12:
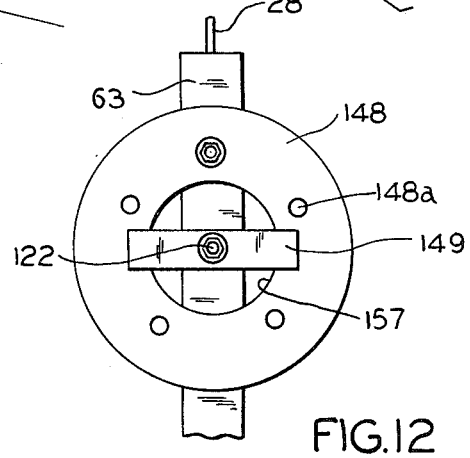
FIG. 12 is a front elevational view showing the manner in which the hub of a wheel is mounted on the carrier illustrated in FIG. 8.

A U-shaped bracket 62 is welded or bolted to the forward face of the channel member 15 with the bight portion 63 disposed parallel to the plane of the face of the channel member and offset therefrom. The bumper assembly 119, in this embodiment, includes a mounting plate 119a provided with a channel 142 welded to the plate. The plate 119a is secured to a bumper 145 by a pair of U-bolts 147. A wheel is mounted on the carrier D by passing the upper bolt 122 through one of the lug openings 148a in the hub 148 and is secured in position by a nut cooperating with the bolt. The lower bolt 122 will coincide substantially with the center of the hub opening 157 and will project through the hub opening. A retainer bracket 149 provided with a hole is then applied over the hub 148, as illustrated in FIG. 12, and secured thereto by a nut. Thus, the wheel is secured on the carrier D against lateral movement.

Figure 11:
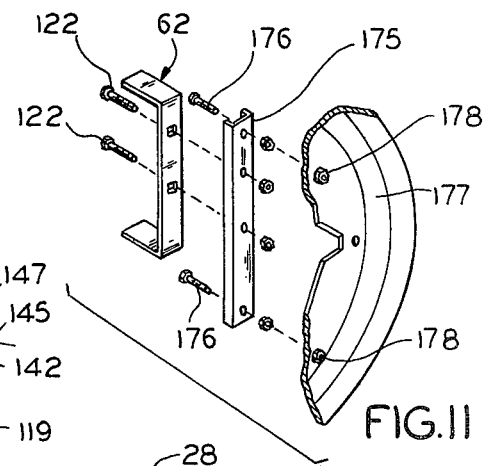
FIG. 11 is an exploded perspective view of a modified wheel mounting means.
Figure 13:
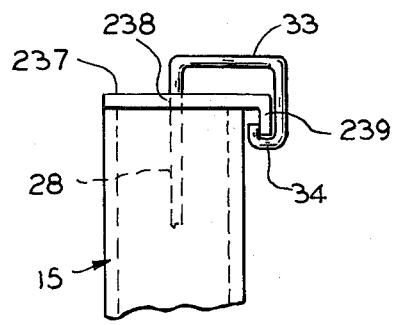
FIG. 13 is an elevational view of a modified structural detail.

FIG. 11 shows a modified embodiment for use with wheels having larger hubs and hub openings. For such an application, an adapter 175 is provided which has a length greater than the bight portion 63 of the U-shaped bracket 62. The adapter 175 comprises a section of channel iron which has a hole at each end and two intermediate holes which register with the bolts 176 passing through the bracket 62. The hub 177 is mounted, as illustrated in FIG. 11, with the upper and lower bolts 176 passing through corresponding lug openings 178 in the hub. The spacing of the upper and lower bolts 176 corresponds to the spacing between the lug openings in the hub. Since the wheel is secured against lateral movement, in this instance, the use of a retainer bracket may be eliminated.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. A spare wheel carrier comprising
(a) a first member adapted for mounting on the rear bumper of a vehicle,
(b) a second member pivotally secured at its lower end to said first member and arranged to be swung between a vertical position adjacent to said first member and a horizontal position forwardly of said bumper,
(c) said second member constituted by a flanged channel member comprising a pair of side walls connected by a forwardly directed wall and having a reinforcing brace at the rear thereof extending between the side walls, and a pair of bolts in vertical alignment extending forwardly from the web thereof for mounting differently apertured hubs of a vehicle wheel thereto,
(d) a spring-biased latch element, located between the side walls, pivotally mounted within said channel member at an intermediate part thereof and terminating in a hook portion for engagement with a part of said first member,
(e) a resilient rod-lock operating member for said latch element having the major portion thereof extending through said channel with the lower end thereof connected to said hook portion of said latch element, and the upper end thereof extending through an opening at the upper end of said channel member and contoured in the form of a handle adapted to pull said latch element from locking engagement with said first member against the spring-bias of said latch element, (f) the terminal portion of said handle constituting a hook adapted to be moved into engagement with an opening at the top of the channel member when the operating member is deformed under stress thereby preventing accidental release of said first-mentioned latch element.

2. A device as set forth in claim 1, including universal mounting means for vehicle wheel hubs having eight and five mounting holes, the top hole in each case adapted to receive the upper one of said vertically aligned bolts for clamping the hub to the forwardly directed wall of said channel member, a reversible angled sheet-metal retaining member having an elongated vertical slot at the central mid-portion thereof for receiving the lower one of said bolts in its alternate positions for clamping said plate to the forwardly directed wall of said channel member with the hub therebetween, a pair of lugs projecting from the plane of said retaining member at one end thereof for embracing the side walls of said channel member which, in the case of the eight-hole wheel hub, are adapted to be disposed at the top of said retaining member while the bottom edge of the retaining member is adapted to overlie the bottom mounting hole, and in the case of the five-hole hub, the lugs are adapted to extend through the bottom pair of holes before embracing the side walls of the channel member.

* * * * *